United States Patent [19]

Houlf

[11] 4,022,412
[45] May 10, 1977

[54] FOOD MIXER SUPPORT

[75] Inventor: Harold A. Houlf, Calumet Park, Ill.

[73] Assignee: Lawrence Peska Associates, Inc., New York, N.Y.

[22] Filed: Aug. 28, 1975

[21] Appl. No.: 608,782

[52] U.S. Cl. .............................. 248/13; 248/206 A; 248/295

[51] Int. Cl.² ..................... F16F 15/00; F16M 1/00

[58] Field of Search ................ 248/13, 12, 14, 16, 248/17, 176, 124, 125, 295, 206 A; 259/DIG. 35

[56] References Cited

UNITED STATES PATENTS

| 725,808 | 4/1903 | Weidner | 248/295 |
| 1,689,103 | 10/1928 | Bendixen | 248/295 X |
| 1,783,651 | 12/1930 | Johnson | 259/DIG. 35 |
| 2,329,932 | 9/1943 | Nelson | 248/125 |
| 3,064,951 | 11/1962 | Fillweber | 259/DIG. 35 |

FOREIGN PATENTS OR APPLICATIONS

| 790,463 | 7/1968 | Canada | 248/206 A |
| 1,196,251 | 6/1970 | United Kingdom | 248/206 A |

Primary Examiner—J. Franklin Foss

[57] ABSTRACT

The disclosed supporting device is adapted for holding and supporting portable food mixers to permit the user to perform other chores while foods like sauces are continually mixed during cooking. The device includes jaws for grasping mixers which are otherwise intended for primarily hand-held use. Devices for stovetop mounting for wall mounting directly on large kettles are included.

1 Claim, 3 Drawing Figures

FOOD MIXER SUPPORT

BACKGROUND OF THE INVENTION

The invention is in the area of food preparation devices, particularly, devices for mixing. There are many commercially available food mixer devices in which the mixer head including electric motor and beaters are included with a support in one integral unit e.g. U.S. Pat. No. 2,891,745; June 23, 1959. These devices tend to be relatively expensive. There are also support devices made for holding primarily hand held mixers which mixers include specifically designed integral attachment devices e.g. U.S. Pat. No. 3,170,674; Feb. 23, 1965. However, the owners of ordinary, inexpensive hand held mixers with no built-in attachment devices, could oftentimes make good use of a simple, inexpensive universally adaptable mixer support for occasional use.

SUMMARY OF THE INVENTION

A supporting device has been invented which is universally adaptable to hold inexpensive hand held food mixers of the type found in most homes today. The mixer is clamped between jaws so as not to require that the mixer have a built-in attachment device. The supporting device has a base adapted for either stove top, counter top mounting or wall mounting. For commercial service, the base can even be adapted for mounting directly to the edge of large steam kettles. A support arm holds the clamping jaws at the desired height above the food container being mixed. Hand held mixers are usually used for short term mixing of mixtures intended for further cooking (e.g. cake batter). In such use, hand holding offers little inconvenience. However, for such cooked dishes as sauces, which must be continually mixed during cooking, hand holding becomes burdensome. For such uses, the availability of the inexpensive universal support of the invention becomes desirable.

DETAILED DESCRIPTION OF THE INVENTION

Figure 1:
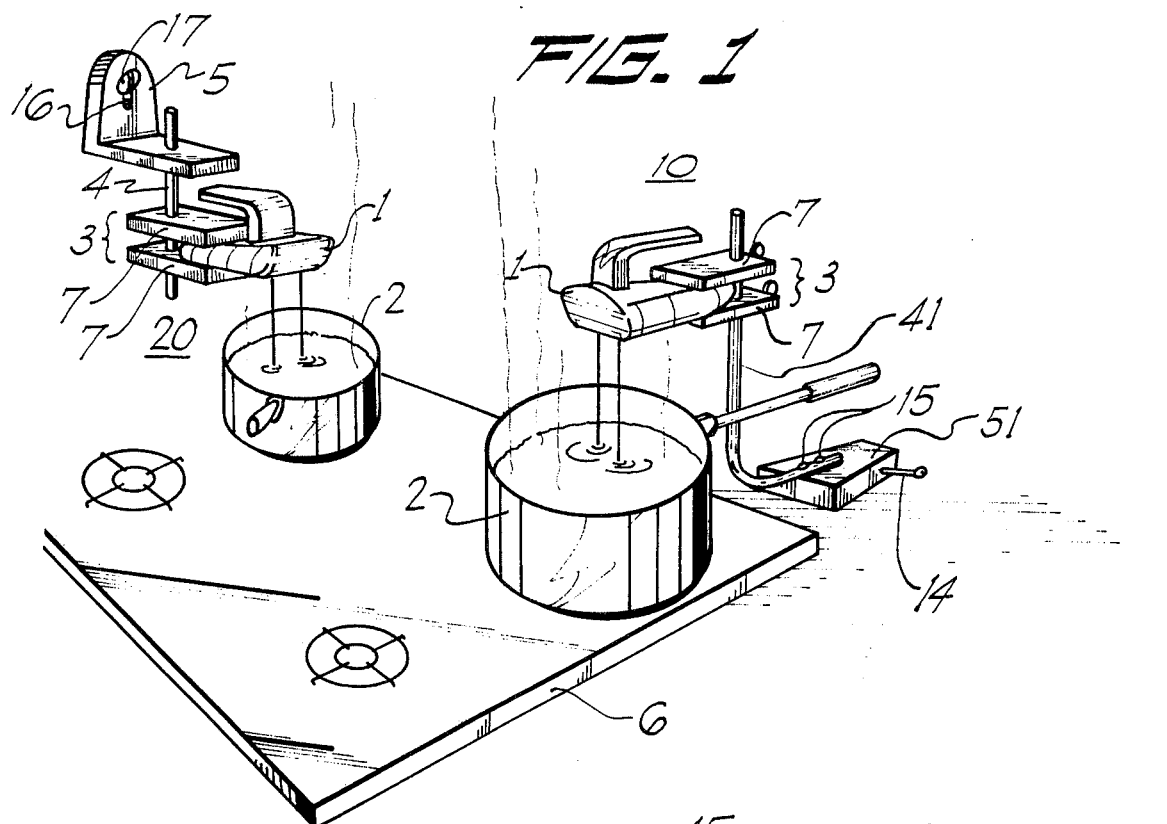
FIG. 1 is a perspective view showing two exemplary supports, of the invention, in use.
Figure 3:
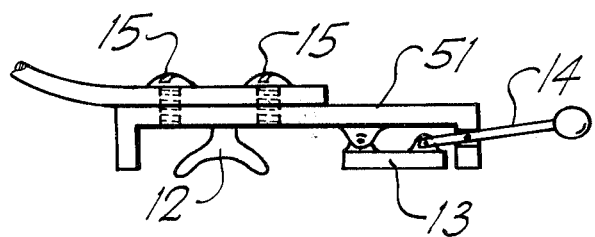
FIG. 3 is an elevational view in section of an exemplary base.

FIG. 1 shows two exemplary food mixer supports of the invention 10, 20. Support 10 is adapted for mounting on a horizontal surface 6, such as a stove top or counter top. The base 51 is equipped, for example (see FIG. 3), with a suction cup 12 or a strong magnet 13 (for use on a steel surface). Lever 14 is used to break the magnetic attraction for removal of the mount from the surface. The support arm 41 extends upward and holds the mixer 1 above the pot 2 at the desired height. The clamping device 3, including moveable jaws 7 is shown as vertically grasping the mixer. For some mixer shapes, horizontal grasping may be desirable. In such cases the clamp 3 can be provided with a swivel arrangement. Assembly screws 15 can be provided for disassembly of the mount for convenience of storage.

Support 20 is a wall mounted unit, base 5 of which is provided with a slotted hole 16 and adapted for accepting a single mounting screw 17. The support arm 4 extends downward of the base 5. The clamping device 3 slideably engaged with the arm 4 so as to permit the mixer 1 to be held at the desired height above the pot 2.

Figure 2:
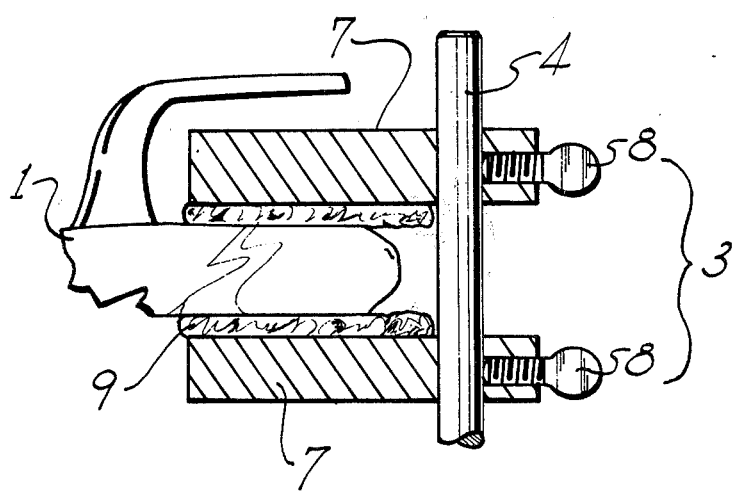
FIG. 2 is an elevational view in section of an exemplary clamping device.

FIG. 2 shows an exemplary clamping device 3, consisting of gripping jaws 7 with rubber faces 9 held to the support arm 4 by means of thumb screws 8.

An exemplary wall mounted unit 20, as pictured in FIG. 1, is more fully described as comprising a) an L-shaped base 5 including an upward extending first member for engaging the vertical surface, which first member defines a slotted hole adapted for accepting a mounting screw 17, and an outward extending second member with a vertical hole extending therethrough proximally of the outer end; b) an arm 4 consisting essentially of a rod extending through the vertical hole and downward of the second member, the rod being fixed in the hole; and c) a clamping means 3 including two jaws 7, each including a flat rubber covered horizontal face 9, a vertical hole extending through each jaw 7 adjacent to one end thereof, slidably engaging the rod 4, a horizontal threaded hole in the end of each jaw intersecting the vertical hole, and a thumb screw 8 engaging each threaded hole for arresting motion of the jaw 7 with respect to the rod 4, wherein the horizontal faces are parallel and disposed opposite one another: whereby the jaws 7 are adapted for grasping any portable electric food mixer 1 so as to adjustably position the mixer relative to the food being mixed.

What is claimed is:

1. A food mixer support adapted for being affixed to a vertical surface comprising:

a. an L-shaped base including an upward extending first member for engaging the vertical surface, which first member defines a slotted hole adapted for accepting a mounting screw, and an outward extending second member with a vertical hole extending therethrough proximally of the outer end;

b. an arm consisting essentially of a rod extending through the vertical hole and downward of the second member, the rod being fixed in the hole; and c. a clamping means including two jaws, each including a flat rubber covered horizontal face, a vertical hole extending through each jaw adjacent to one end thereof, slidably engaging the rod, a horizontal threaded hole in the end of each jaw intersecting the vertical hole, and a thumb screw engaging each threaded hole for arresting motion of the jaw with respect to the rod, wherein the horizontal faces are parallel and disposed opposite one another; whereby the jaw are adapted for grasping any portable electric food mixer so as to adjustably position the mixer relative to the food being mixed.

* * * * *